(No Model.)
S. D. G. NILES.
NAIL AND FIRE TONGS.
No. 367,227. Patented July 26, 1887.
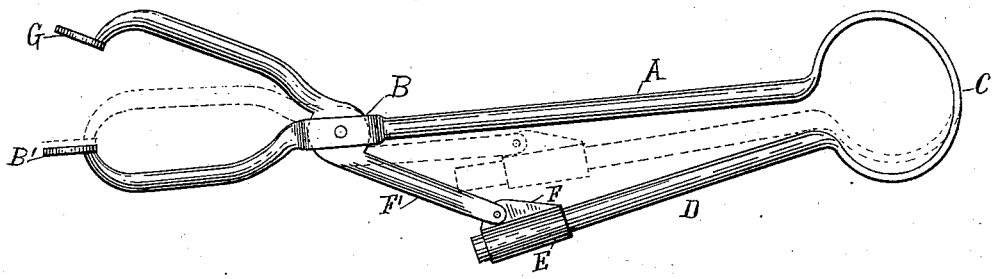
Fig. 1.
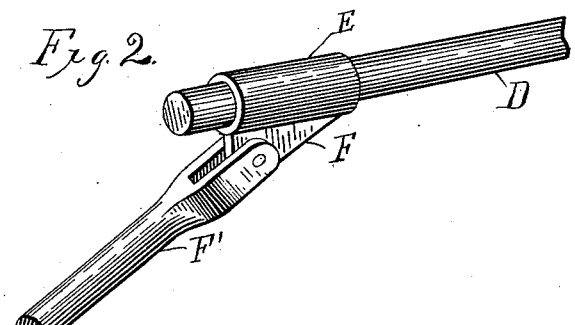
Fig. 2.
Fig. 3. Fig. 4.
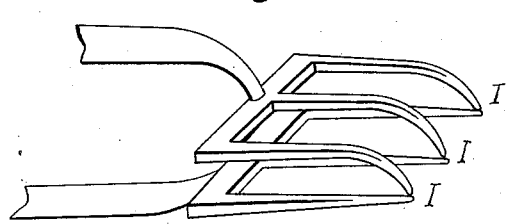
Witnesses
John S. Finch Jr.
C. R. Davis
Inventor
S. D. G. Niles.
By his Attorney
C. M. Alexander
N. PETERS, Photo-Lithographer, Washington, D. C.

UNITED STATES PATENT OFFICE.

SINCLAIR D. G. NILES, OF TRIGONIA, TENNESSEE.

NAIL AND FIRE TONGS.

SPECIFICATION forming part of Letters Patent No. 367,227, dated July 26, 1887.

Application filed March 7, 1887. Serial No. 230,067. (No model.)

*To all whom it may concern:*

Be it known that I, SINCLAIR D. G. NILES, a citizen of the United States, residing at Trigonia, in the county of Loudon and State of Tennessee, have invented certain new and useful Improvements in Nail and Fire Tongs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in tongs; and it has for its objects to provide for automatically keeping the prehensile ends apart, to give increased leverage power in closing the same, and to adapt the prehensile ends to various different purposes, as more fully hereinafter specified. These objects I attain by the means illustrated in the accompanying drawings, in which—

Figure 1 represents a side elevation of my improved tongs complete. Fig. 2 is a detached perspective view of a portion of the device; Fig. 3, a detached perspective view of one of the grasping ends, and Fig. 4 a perspective view showing a modification of said grasping or prehensile end.

The letter A indicates a rigid arm, which is enlarged and slotted at B. The forward end of said arm is curved, and at its extremity is provided with a grasping bearing, B', which will vary according to the use for which the tongs are intended. The arm at the rear is formed into an annular leaf-spring, C, from which extends forwardly a short arm, D, which has fitted upon it a sliding sleeve, E, having a lug, F, at one side. The letter F' indicates a lever which is fulcrumed in the slotted portion B of the arm A. The forward end of said arm is curved and provided with a grasping extremity, G, similar to that on the arm A. The grasping ends of the tongs may be of various forms, according to the use for which they are intended. When used for wood, they are circular, as shown in Fig. 1 of the drawings. For coal they are oblong, as shown in Fig. 3, and provided with angular projections H at the edges. For nails or other similar loose articles the grasping ends are composed of a series of tines or fingers, I, as shown in Fig. 4.

As constructed, it will be observed that the lever is fulcrumed near the prehensile ends of the tongs—the point of greatest resistance—and in such manner that the said ends cannot get out of line, which is the most serious objection with ordinary tongs, and as the movable arms form a toggle-lever the tongs can be made to give a powerful grasp.

Having thus described my invention, what I claim, and desire to secure by Letters Patent, is—

1. The combination, with the rigid arm slotted near its prehensile end, of the lever pivoted therein, the sleeve pivoted to its rear end, and the movable arm and leaf-spring, substantially as specified.

2. The combination, with the rigid arm, of the pivoted arm and spring-actuated arm connected therewith and forming a toggle-lever, substantially as specified.

In testimony whereof I affix my signature in presence of two witnesses.

SINCLAIR D. G. NILES.

Witnesses:
GEORG W. SWANAY,
EDWARD BRADBURY.